United States Patent
Oh et al.

(10) Patent No.: US 8,894,401 B2
(45) Date of Patent: Nov. 25, 2014

(54) INJECTION MOLD APPARATUS WITH A COOLING AND HEATING PASSAGE

(71) Applicant: GNST Co., Ltd., Gwangju (KR)

(72) Inventors: Hyung Jong Oh, Gwangju (KR); Jae Seung Cho, Gwangju (KR); Nam In Jeong, Gwangju (KR)

(73) Assignee: GNST Co., Ltd., Gwangju (KR)

( * ) Notice: Subject to any disclaimer, the term of this patent is extended or adjusted under 35 U.S.C. 154(b) by 46 days.

(21) Appl. No.: 13/657,912

(22) Filed: Oct. 23, 2012

(65) Prior Publication Data

US 2014/0087017 A1    Mar. 27, 2014

(30) Foreign Application Priority Data

Sep. 27, 2012 (KR) .................. 10-2012-0108123

(51) Int. Cl.
*B29C 45/73* (2006.01)
(52) U.S. Cl.
USPC ........... 425/185; 264/328.16; 425/552
(58) Field of Classification Search
USPC ......... 425/185, 195, 552; 264/328.14, 328.16
See application file for complete search history.

(56) References Cited

U.S. PATENT DOCUMENTS

| 7,172,405 B2 | 2/2007 | Nishioka et al. | |
|---|---|---|---|
| 2002/0162940 A1 * | 11/2002 | Frul et al. .................... | 425/552 |

FOREIGN PATENT DOCUMENTS

| JP | 51-022759 A | 2/1976 |
|---|---|---|
| JP | 55-109639 A | 8/1980 |
| JP | 57-165229 A | 10/1982 |
| JP | 61-079614 A | 4/1986 |
| JP | 04-265720 A | 9/1992 |
| JP | 2009-034695 A | 2/2009 |
| KR | 10-0081909 B1 | 6/1994 |
| KR | 10-0167711 B1 | 9/1998 |
| KR | 10-0470835 B1 | 3/2005 |
| KR | 10-0701229 B1 | 3/2007 |
| KR | 10-2011-0055956 A | 5/2011 |

* cited by examiner

*Primary Examiner* — Tim Heitbrink
(74) *Attorney, Agent, or Firm* — Rabin & Berdo, P.C.

(57) ABSTRACT

The present invention is on injection mold with cooling and heating passage which can form cooling and heating passage close to forming space in the inside of mold body and easily design cooling and heating passage in forming space with complicated trajectory. Injection mold with cooling and heating passage consists of lower mold and upper mold forming blowed forming space by combining said lower mold on the top of said lower mold, provided that said lower mold or said upper mold consists of mold body in which forming space is created on one side so that melted resin is injected and formed; connecting groove depressed towards said forming space from the opposite side of the side with said forming space created; and sealing kit which is inserted into said connecting groove in separation from the end of forming space of said connecting groove and creates cooling and heating passage 60) in said separated space.

9 Claims, 3 Drawing Sheets

INJECTION MOLD APPARATUS WITH A COOLING AND HEATING PASSAGE

FIELD OF THE INVENTION

The present invention is related to an injection mold with cooling and heating passage which can form a cooling and heating passage close to a forming space in an inside of a mold body and easily design the cooling and heating passage in the forming space with a complicated trajectory.

DESCRIPTION OF RELATED ART

Injection molding is a manufacturing process for producing parts from polymer resins which are melted and plasticized by injecting them into an injection mold using hydraulic power. The injection molding has an advantage being able to mass-produce a variety of parts, from smaller components to larger components.

However, a general polymer resin molding is poor in appearance due to a weld line created by melted resin fed into the inside of the injection mold and has an inferior luster on a surface.

In order to solve these problems, a heated molding has been widely used, which sets temperature of the injection mold higher than the melting point of a polymer resin. For example, Japanese Patent 45-22020, Japanese Patent 51-22759, Japanese Patent 55-109639, Japanese Patent 57-165229, Japanese Patent 61-79614, and Japanese Patent 4-265720 disclose the heating molding.

If the polymer resin is formed at a higher temperature than the melting point of resin, a product has a better appearance and quality without the weld line and with good luster, but it requires a longer cooling time and in turn, a longer total forming cycle, which decreases the productivity.

In order to resolve these problems, an injection molding temperature auto-control system is disclosed in Korean Patent No. 10-0081909, a mold cooling system is disclosed in Korean Patent No. 10-0167711 and a mold temperature control system is disclosed in Korean Patent No. 10-0470835. In addition, Korean Patent No. 10-0701229 presents a structure which can make quick heating and freezing of the mold within the range of 100 to 200° C./min.

However, the cited prior art could not be a fundamental solution for the abovementioned problems, since they cannot cool and heat the injection mold in a short time and have many cooling lines and hot water supply lines for cooling and heating, which cause the mold to be deformed due to the relatively weak structure of the mold. In particular, the conventional injection molds have an inlet at a bottom of the molds corresponding to a cavity so as to reduce thermal capacity for cooling and heating. However, if the inlet is formed at the bottom of the mold, the mold becomes relatively weak and may have cracks due to an external impact or a repeated injection molding.

Meanwhile, a conventional weld-less injection molding presents a method to form a cooling and heating passage in a body of an injection mold such that a forming trajectory of the cooling and heating passage is in close vicinity to a trajectory of a forming space.

This method could not maximize cooling and heating effect if the cooling and heating passage installed in an upper and lower mold or a core which constitute the forming space are not formed in close vicinity to the forming space, for all that this method has a good performance of the cooling and heating system for the weld less molding or the injection molding. In particular, if the forming space is complicated in structure, a passage for cooling water and hot water could not be formed in a uniform thickness along the forming space, which causes a cooling efficiency to be lowered.

Therefore, it is necessary to develop an injection mold by which it is easy to form a cooling and heating passage of the injection mold in close to the forming space of said mold.

PREVIOUS TECHNICAL LITERATURE

Patent Literature (Patent Literature 0001) Japanese Patent JP 2009-34695 (Disclosure No.) 2009 Feb. 19
(Patent Literature 0002) Korean Patent Publication KR 10-2011-0055956 (Disclosure No.) 2011 May 26
(Patent Literature 0003) U.S. Pat. No. 7,172,405 (Registration No.) 2007 Feb. 6

DESCRIPTION OF THE INVENTION

Tasks to be Solved

A purpose of the present invention is to provide an injection mold with cooling and heating passage, which can form a cooling and heating passage (60) in close vicinity to a forming space (13) in an inside of a mold body (31) of an upper mold (20) and a lower mold (30).

The present invention also aims to provide an injection mold with cooling and heating passage which can design a cooling and heating passage (60) suitable for a forming space (13) with complicated trajectory.

Means to Solve Tasks

The present invention includes a lower mold and an upper mold which forms a forming space in combination with said lower mold at a top of said lower mold, wherein said lower mold or said upper mold consist of a mold body which has the forming space on one side such that melted resin may be injected and formed; a connecting groove which is depressed towards said forming space from the opposite side of said forming space of said mold body; and a sealing kit which is inserted into said connecting groove such that a heating passage (60) is formed between the connecting groove and the sealing kit.

Also, the present invention features that the connecting groove is formed by multiple vertical holes arranged in a row and overlapped each other and formed close to a floor surface of said forming space, and said sealing kit is formed by multiple columns arranged in a row and side by side in contact with each other.

Effect of the Invention

The present invention can form the cooling and heating passage (60) in close vicinity to the forming space (13) in the inside of the mold body (31) of the upper mold (20) and the lower mold (30) and reduce a cooling and heating time of resin during a process of the injection molding of the product. Therefore, the present invention has an effect of promoting production efficiency by reducing a cycle time for the injection molding.

Also, the present invention can make each of the vertical holes (41) by a mechanical processing manner such that the vertical holes (41) form a channel and can easily design the cooling and heating passage (60) suitable for the forming space (13) with complicated trajectory.

BRIEF DESCRIPTION OF THE SEVERAL VIEW OF THE DRAWING

SPECIFIC DESCRIPTION FOR EMBODIMENT OF THE PRESENT INVENTION

Hereinafter, the injection mold has a cooling and heating passage according to the embodiment of the present invention is described in detail with reference to attached drawings.

Figure 1:
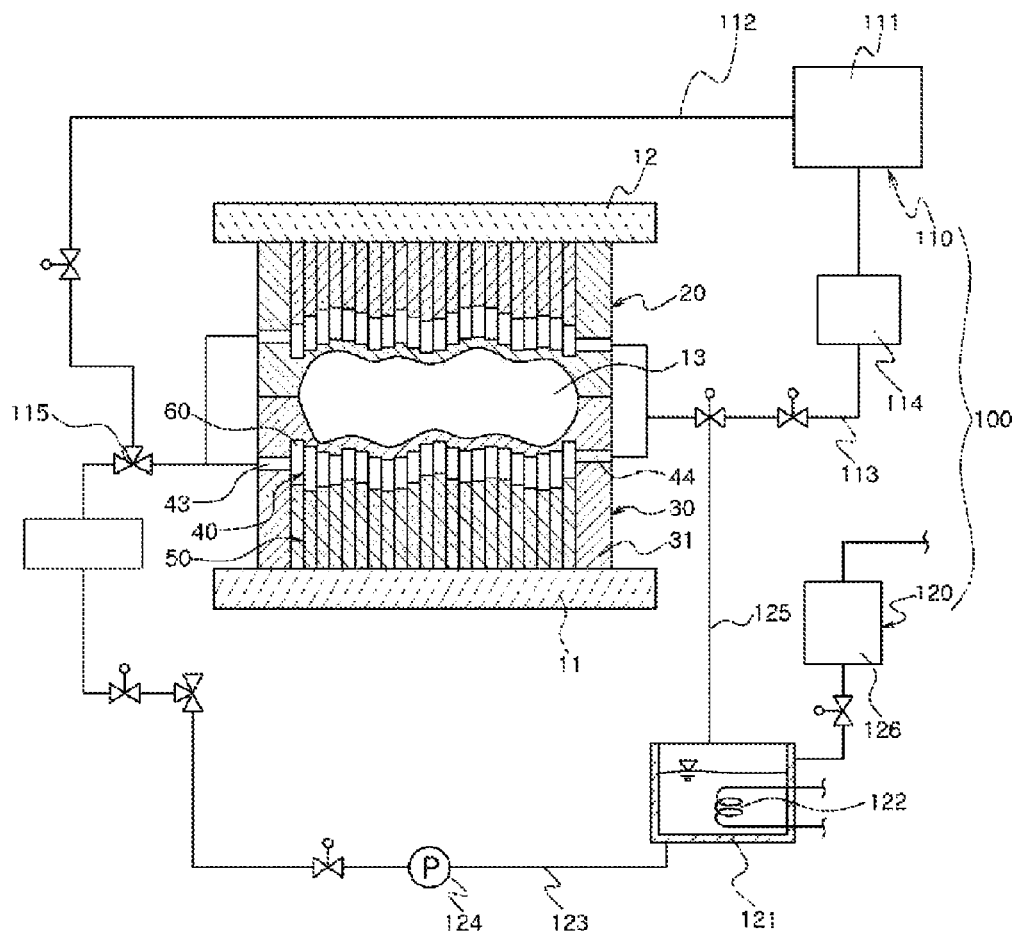
FIG. 1 is a sectional view of the injection mold with a cooling and heating passage according to an embodiment of the present invention.
Figure 2:
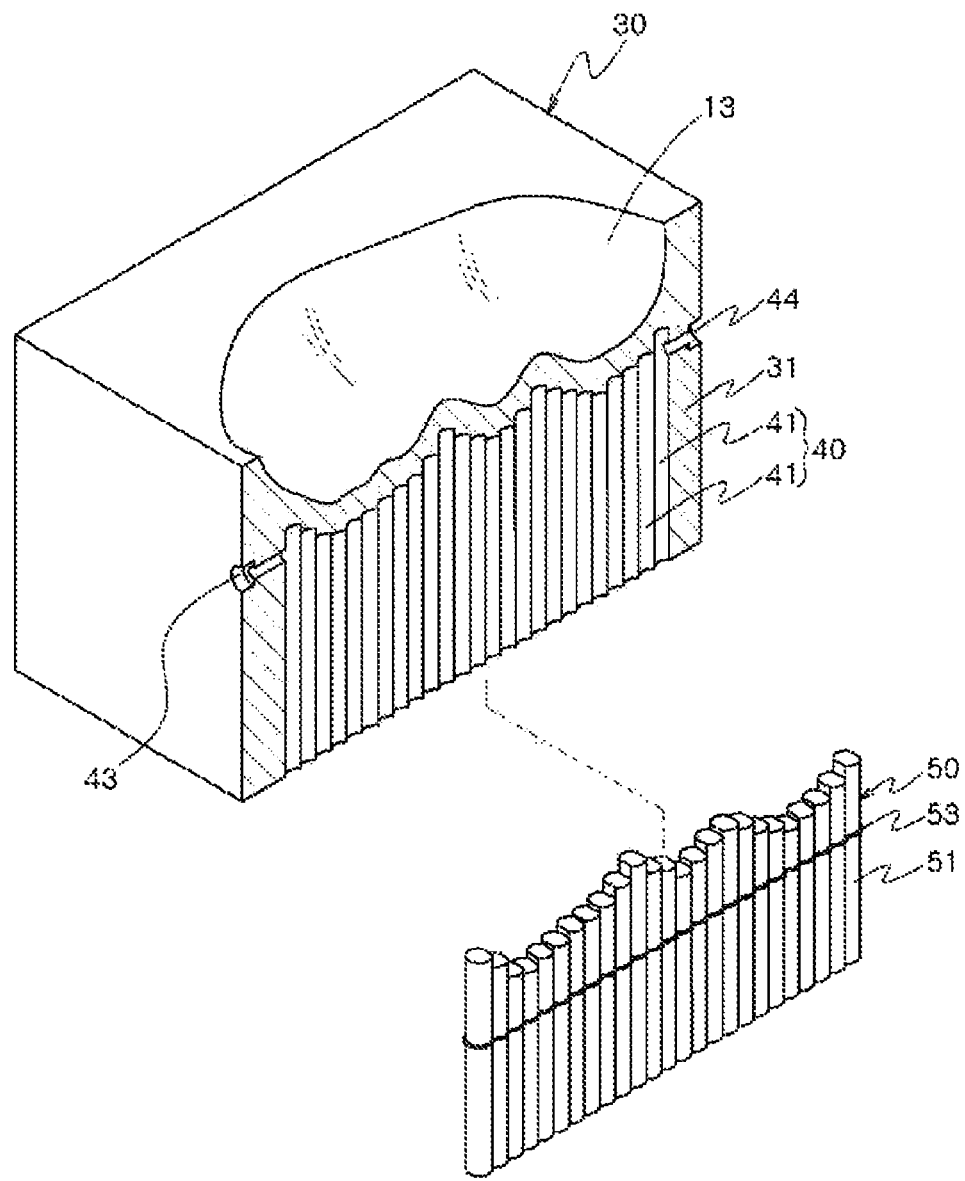
FIG. 2 is a partial separate perspective view in section of injection mold with a cooling and heating passage according to an embodiment of the present invention.
Figure 3:
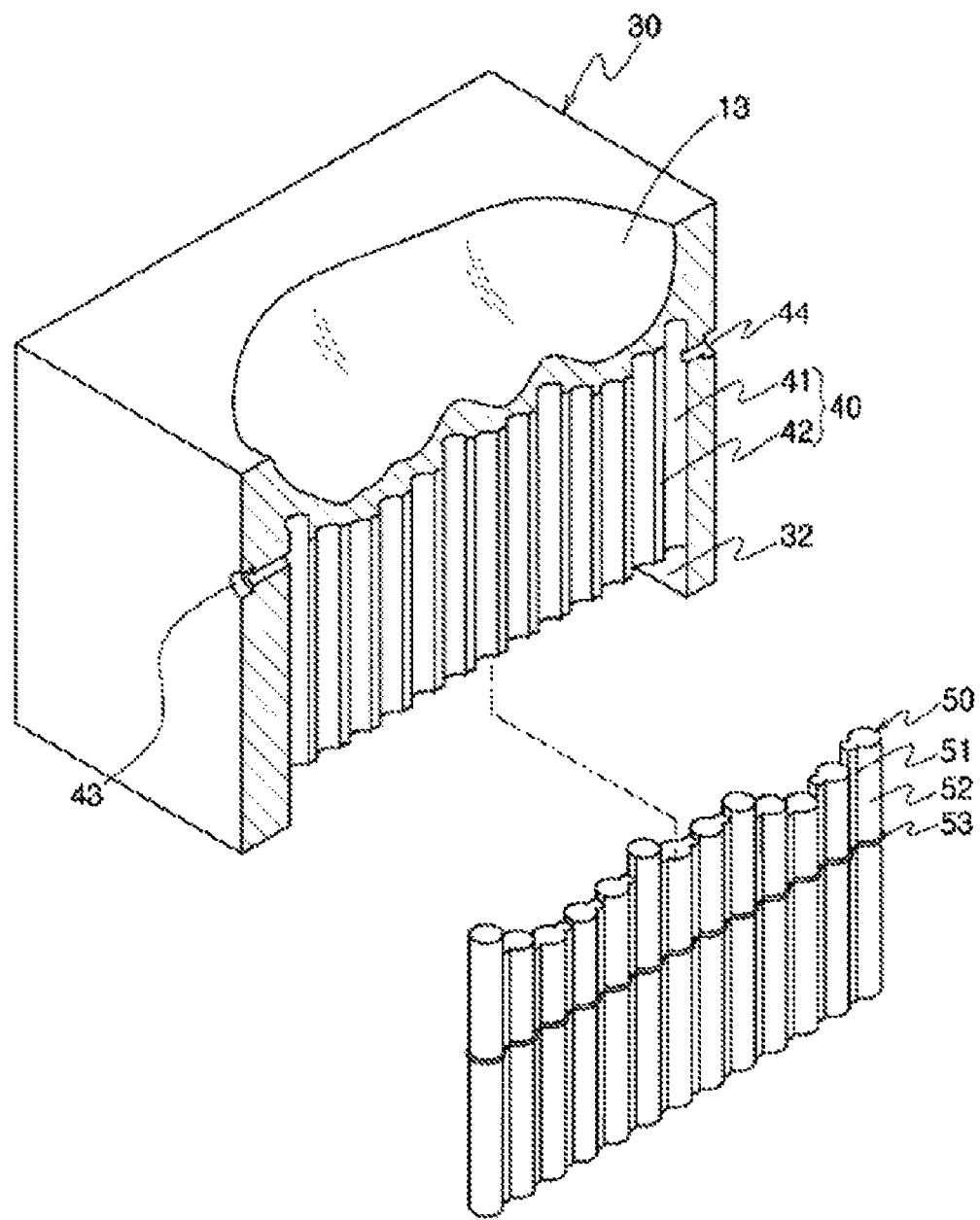
FIG. 3 is a partial separate perspective view in section of injection mold with a cooling and heating passage according to another embodiment of the present invention.

FIG. 1 is a sectional view of an injection mold having a cooling and heating passage according to an embodiment of the present invention, FIG. 2 is a partial separate perspective view in section of the injection mold with cooling and heating passage according to the embodiment of the present invention, and FIG. 3 is a partial separate perspective view in section of the injection mold with cooling and heating passage according to another embodiment of the present invention.

According to FIG. 1 through FIG. 3, the injection mold has a cooling and heating passage of the present invention includes a lower fixation plate (11), an upper fixation plate (12) which is installed opposite to the lower fixation plate (11) over the lower fixation plate (11), a lower mold (30) installed on the lower fixation plate (11), and an upper mold (20) installed in a bottom of the upper fixation plate (12) and combined with the lower mold (30).

The lower fixation plate (11) serves as a conventional support base and fixes the lower mold (30) so that a stable molding process may be carried out. For this, the lower base may be made in a form of plate or frame, but is not limited to these forms.

The upper fixation plate (12) is movable and allows the upper mold (20) fixed in the bottom thereof to be combined with or separated from the lower mold (30). For this, the upper fixation plate (12) is raised up and get down by a rack gear (not shown) and a hydraulic piston (not shown). In other words, for forming injection products, the upper mold (20) is get down to be combined with and sealed the lower mold (30), and upon completion of forming the injection products, the upper mold (20) is raised up to collect the completed injection products from the lower mold (30). This upper fixation plate (12), likewise the lower fixation plate (11), may be created in the form of plate or frame, but is not limited to the form. Also, the means for moving the upper fixation plate (12) also are not limited to those types, and of course, it is easy to use a power transfer unit in separating or combining the upper mold (20) and the lower mold (30) by moving the upper fixation plate (12).

As the upper mold (20) and the lower mold (30) are same in configuration according to the embodiment of the present invention as shown in FIG. 1, only components of the lower mold (30) will be described from now on. Each component of the lower mold (30) described from now on applies to the upper mold (20) in the same way. In addition, because the upper mold (20) is a flip-over form of the lower mold (30), the upper and lower directions of the components of the lower mold (30) apply to the upper mold (20) inversely.

The lower mold (30) includes a mold body (31) which has a forming space (13) on the top so that melted resin is injected and formed, a connecting groove (40) depressed from a lower side of the mold body (31) toward the forming space (13) such that an end of the connecting groove (40) is apart from a bottom surface of the forming space (13) at a regular interval, and a sealing kit (50) which is inserted into the connecting groove (40) and forms a cooling and heating passage (60) between the connecting groove (40) and the end thereof.

In detail, the connecting groove (40) is formed by multiple vertical holes (41) in the mold body (31) of the lower mold (30) and the multiple vertical holes (41) are extended from the lower side of the mold body (31) to a vicinity of the forming space (13). Also, neighboring two holes of the multiple vertical holes (41) are overlapped with each other. That is, the connecting groove (40) is formed by the vertical holes (41) formed in a direction of the forming space (13) from the opposite side of the forming space (13), and these vertical holes (41) can be made by drilling from the lower side of the mold body (31), and the cooling and heating passage (60) is formed between an inside end of the vertical holes (41) an inside end of a sealing kit (50) to be described in the following.

The sealing kit (50), which is made in a form that a section of the sealing kit (50) is corresponding to a section of the connecting groove (40), is inserted into the connecting groove (40), and an inner space of the connecting groove (40) into which the sealing kit (50) is not inserted, serves to form the cooling and heating passage (60). That is, an external circumference of the sealing kit (50) and an internal circumference of the connecting groove (40) are fit to each other and sealed, and the inner space surrounded by the internal circumference of the connecting groove (40) and the inside end of the sealing kit (50) becomes the cooling and heating passage (60). For this, the sealing kit (50) is formed by multiple columns (51) as shown in FIG. 2, that is, a horizontal sectional form of the connecting groove (40) is corresponding to a horizontal sectional form of the sealing kit made by the multiple columns.

The inside end of the sealing kit (50) has the same trajectory as a trajectory of said forming space (13) or a trajectory the inside end of the connecting groove (40), and the cooling and heating passage (60) is formed between the trajectory of the inside end of said connecting groove (40) and the trajectory of the inside end of the sealing kit (50).

In some cases, because a curve of the floor surface of the forming space (13) is very complicated, a space formed by a vertical hole (41) and the connecting groove (40) may be shorter than a space formed by a next vertical hole (41) and the connecting groove (40), thereby a channel created by the connecting groove (40) and the sealing kit (50) may be blocked. In this case, it is possible to make the channel smooth by adjusting a depth of the vertical hole (41) and/or a length of each column of the sealing kit (50).

In addition, the sealing kit (50) can have at least one sealing protrusion (53) along an external circumference to improve airtight force with a side wall of the connecting groove (40), that is, mold body (31). Also, the sealing kit (50) can have multiple sealing protrusions (53) formed, for example, in a top portion and a bottom portion.

Meanwhile, each of vertical holes (41) may be formed at regular intervals from one another without overlapping each other. At this time, a connecting hole (42) can be formed between the vertical holes (41) as shown in FIG. 3. It is desirable that a diameter of the connecting hole (42) is less than that of the vertical hole (41) so as to minimize a part to be processed, and it is desirable to use an electrical discharge machining for forming the vertical holes.

At this time, columns (51) which have the same sectional form as of the vertical hole (41), are interconnected with a connecting part (52) which has the same sectional form as of said connecting hole (42).

Meanwhile, in a case where the lower mold (30) and the mold body (31) are relatively thick, an inlet groove (32) having a predetermined depth can be formed at the bottom of the mold body (31) as shown in FIG. 3, and the connecting groove (40) and the inserting sealing kit (50) can be formed from the inlet groove (32).

Also, on both sides of the lower mold (30), a supply hole (43) and a discharge hole (44) for supplying and discharging a cooling fluid and a heating fluid to and from the cooling and heating passage (60) are formed such that they are connected to more than one vertical hole (41).

Meanwhile, the cooling and heating unit (100) supplies cooling or hot water to the cooling and heating passage (60) so as to cool or heat the mold and includes a heating part (110) and a cooling part (120).

The heating part (110) consists of a boiler (111), a first circulation pipe (112) which joins the boiler (111) and the supply hole (43) together to supply steam or hot water from the boiler (111) to the cooling and heating passage (60), and a second circulation pipe (113) which joins the boiler (111) and a discharge hole (44) together to recover the steam or hot water which are discharged through the cooling and heating passage (60) to the boiler (111).

A first control valve (115) may be installed in the first circulation pipe to connect/disconnect the steam or hot water from the cooling and heating passage (60) and a condensate tank (114) may be installed in the second circulation pipe (113) to store condensed water.

The heating part (110) is not limited to the abovementioned embodiment but consists of a heater which is installed in a place close to the forming space (13). In this case, a first fluid passage (not shown) may be formed separately around the heater. The heater may be supported by the sealing kit (50) and installed in close vicinity to the forming space (13).

The cooling part (120) is used to cool the forming products positioned in the forming space (13) and the injection mold. It discharges the hot water supplied to the cooling and heating passage (60) using a coolant to cool the injection mold.

The cooling part (120) consists of a cooling media tank (121) in which a cooling media such as cooling water or cooling oil, is stored, a third circulation pipe (123) which joins said cooling media tank (12) and the supply hole (43) together so as to supply the cooling media from the cooling media tank (121) to said cooling and heating passage (60), and a fourth circulation pipe (125) which joins the cooling media tank (121) and the discharge hole (44) together in order to recover the cooling media discharged through the cooling and heating passage (60). Where the third circulation pipe (123) may include a cooling media supply pump (124). Meanwhile, the cooling media tank (121) is connected to a water supply tank (126) to make up for loss of the cooling media. In addition, a cooling system (122) may be installed to cool the cooling media in the cooling media tank (121). Although this cooling system (122) is not shown in drawings, it may consist of a system which is operated by a common cooling cycle with a evaporator, a condensor and a compressor.

The cooling part (120) is not limited to the abovementioned embodiment but can be implemented by any structure which can quickly cool the mold in a short time. For example, Nigrogen may be supplied to the cooling and heating passage (60), and for this purpose, a nitrogen tank and a valve may be furnished to connect or disconnect Nitrogen.

The present invention, as described above, can make the cooling and heating passage (60) in close vicinity to the forming space (13) inside of the mold body (31) of the upper mold (20) and the lower mold (30) and shorten the heating and cooling time for resins while producing the products by the injection molding and reduce the cycle time for producing the products thereby increasing the production efficiency.

Also, the present invention processes each of vertical holes (41) by a mechanical processing manner and forms the channel by overlapping the vertical holes (41), whereby the cooling and heating passage (60) may be easily designed even though the forming space (13) has a complicated curve.

DESCRIPTION OF SYMBOLS

11: lower fixation plate; 12: upper fixation plate; 13: forming space; 20: lower mold; 21: mold body; 30: upper mold; 40: connecting groove; 41: vertical hole; 42: connecting hole; 50: sealing kit; 60: cooling and heating passage

What is claimed is:

1. An injection mold with cooling and heating passage, comprising:
    a lower mold; and
    an upper mold forming a forming space in combination with the lower mold, each of the lower mold and the upper mold including
        a mold body having a part of the forming space in a first side thereof in which a melted resin is injected and formed;
        a connecting groove having multiple vertical holes formed in a row towards the forming space from a second side of the mold body, the second side of the mold body being an opposite side of the first side of the mold body, the multiple vertical holes being arranged in a row and side by side in contact with each other; and
        a sealing kit formed by multiple columns arranged in a row and side by side in contact with each other and having a first end inserted into the connecting groove, a portion of the sealing kit being inserted into the connecting groove and airtightly sealing the connecting groove from the second side of the mold body; and
        a cooling and heating passage formed inside the connecting groove and enclosed by an inner wall of the connecting groove and an first end of the sealing kit.

2. The injection mold as claim 1, wherein said each of the multiple vertical holes of the connecting groove is separated from neighboring two holes, the connecting groove further has connecting holes disposed between the multiple vertical holes, and
    wherein said sealing kit further includes multiple connecting parts disposed between the multiple columns, and each of the connecting parts is inserted into corresponding one of the connecting holes of the connecting groove.

3. The injection mold as claim 1, wherein said vertical holes are extended from the second side of the mold body to a close vicinity of a floor surface of said forming space.

4. The injection mold as claim 1, wherein said sealing kit is formed to have the same horizontal sectional shape as that of said connecting groove.

5. The injection mold as claim 4, wherein said sealing kit has a sealing protrusion installed on an external circumference of said sealing kit.

6. The injection mold as claim 1, wherein said mold body includes an inlet groove formed in the second side of the mold body and depressed towards the first side from the second side, and said connecting groove is depressed from the inlet groove to the second side of the mold body.

7. The injection mold as claim 2, wherein said vertical holes are extended from the second side of the mold body to a close vicinity of a floor surface of said forming space.

8. The injection mold as claim 2, wherein said sealing kit is formed to have the same horizontal sectional shape as that of said connecting groove.

9. The injection mold as claim 1, wherein said mold body further has a supply hole connecting a first lateral side of the mold body and the connecting groove and a discharge hole connecting a second lateral side of the mold body and the connecting groove.

\* \* \* \* \*